US009934600B2

(12) United States Patent
Sarafa et al.

(10) Patent No.: US 9,934,600 B2
(45) Date of Patent: Apr. 3, 2018

(54) TECHNIQUES TO CONFIGURE DEVICE DISPLAY

(71) Applicant: WhatsApp Inc., Mountain View, CA (US)

(72) Inventors: Randall Sarafa, San Francisco, CA (US); Anton Borzov, London (GB)

(73) Assignee: WHATSAPP INC., Menlo Park, CA (US)

( * ) Notice: Subject to any disclaimer, the term of this patent is extended or adjusted under 35 U.S.C. 154(b) by 154 days.

(21) Appl. No.: 14/979,323

(22) Filed: Dec. 22, 2015

(65) Prior Publication Data
US 2017/0178373 A1    Jun. 22, 2017

(51) Int. Cl.
| | | |
|---|---|---|
| *G06T 11/60* | (2006.01) | |
| *G06T 11/00* | (2006.01) | |
| *G06K 9/38* | (2006.01) | |
| *G06T 7/11* | (2017.01) | |
| *G06T 5/00* | (2006.01) | |

(52) U.S. Cl.
CPC ............ *G06T 11/60* (2013.01); *G06T 11/001* (2013.01); *G06K 9/38* (2013.01); *G06T 5/00* (2013.01); *G06T 5/003* (2013.01); *G06T 7/11* (2017.01)

(58) Field of Classification Search
CPC . G06T 7/194; G06T 7/11; G06T 7/174; G06T 2207/10024; G06T 11/60; G06T 5/00; G06T 5/003; G06K 9/38; G06K 9/4652; G06K 2009/485
See application file for complete search history.

(56) References Cited

U.S. PATENT DOCUMENTS

| | | | | |
|---|---|---|---|---|
| 5,953,076 A * | 9/1999 | Astle | ...................... | G06T 7/246 348/580 |
| 6,711,291 B1 * | 3/2004 | Stubler | ................ | G06K 9/3233 345/632 |
| 7,352,912 B2 * | 4/2008 | Eschbach | ........... | G06K 9/00624 382/176 |
| 7,609,847 B2 * | 10/2009 | Widdowson | .......... | G06F 17/211 345/624 |
| 8,046,713 B2 * | 10/2011 | Yamashita | ............... | G09G 3/20 345/658 |
| 2009/0196521 A1 * | 8/2009 | Kaida | .................. | G06K 9/4652 382/254 |

* cited by examiner

*Primary Examiner* — Jeffrey Chow

(57) ABSTRACT

Techniques to configure device display are described. In one embodiment, an apparatus may comprise an image display routine operative to receive an image on a device, the device comprising a display device; receive a text segment on the device; and display a combined text segment image display; a color configuration routine operative to determine a background contrast color; and determine a background blend color based on the image; and a mixing routine operative to generate a color mixing gradient based on the background contrast color and the background blend color; and generate the combined text segment image display by positioning the text segment in a text segment display area of a mixed gradient overlay of the color mixing gradient on the image. Other embodiments are described and claimed.

20 Claims, 12 Drawing Sheets

Original Image 310

Mixed Color Gradient 320

Blending Gradient 330

Mixing Gradient Combined Image 340

*Original Image 310*

*Mixed Color Gradient 320*

*Blending Gradient 330*

*Mixing Gradient Combined Image 340*

TECHNIQUES TO CONFIGURE DEVICE DISPLAY

BACKGROUND

Computer devices may receive images, transmit images, and generally exchange images. Computer devices may display these images using a display device. In some cases, these images may be exchanged via a messaging service. A user may have a user account associated with them in the messaging service, the user account providing an online identity for the user, a destination for messages directed to the user, and generally coordinating the user's access to and use of the messaging service. A user may access the messaging service from a variety of endpoints, including mobile devices (e.g., cellphones), desktop computers, web browsers, specialized messaging applications, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to configure device display. Some embodiments are particularly directed to techniques to configure the display device of a computer device for the display of text in association with an image. In one embodiment, for example, an apparatus may comprise an image display routine operative to receive an image on a device, the device comprising a display device; receive a text segment on the device; and display a combined text segment image display; a color configuration routine operative to determine a background contrast color; and determine a background blend color based on the image; and a mixing routine operative to generate a color mixing gradient based on the background contrast color and the background blend color; and generate the combined text segment image display by positioning the text segment in a text segment display area of a mixed gradient overlay of the color mixing gradient on the image. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
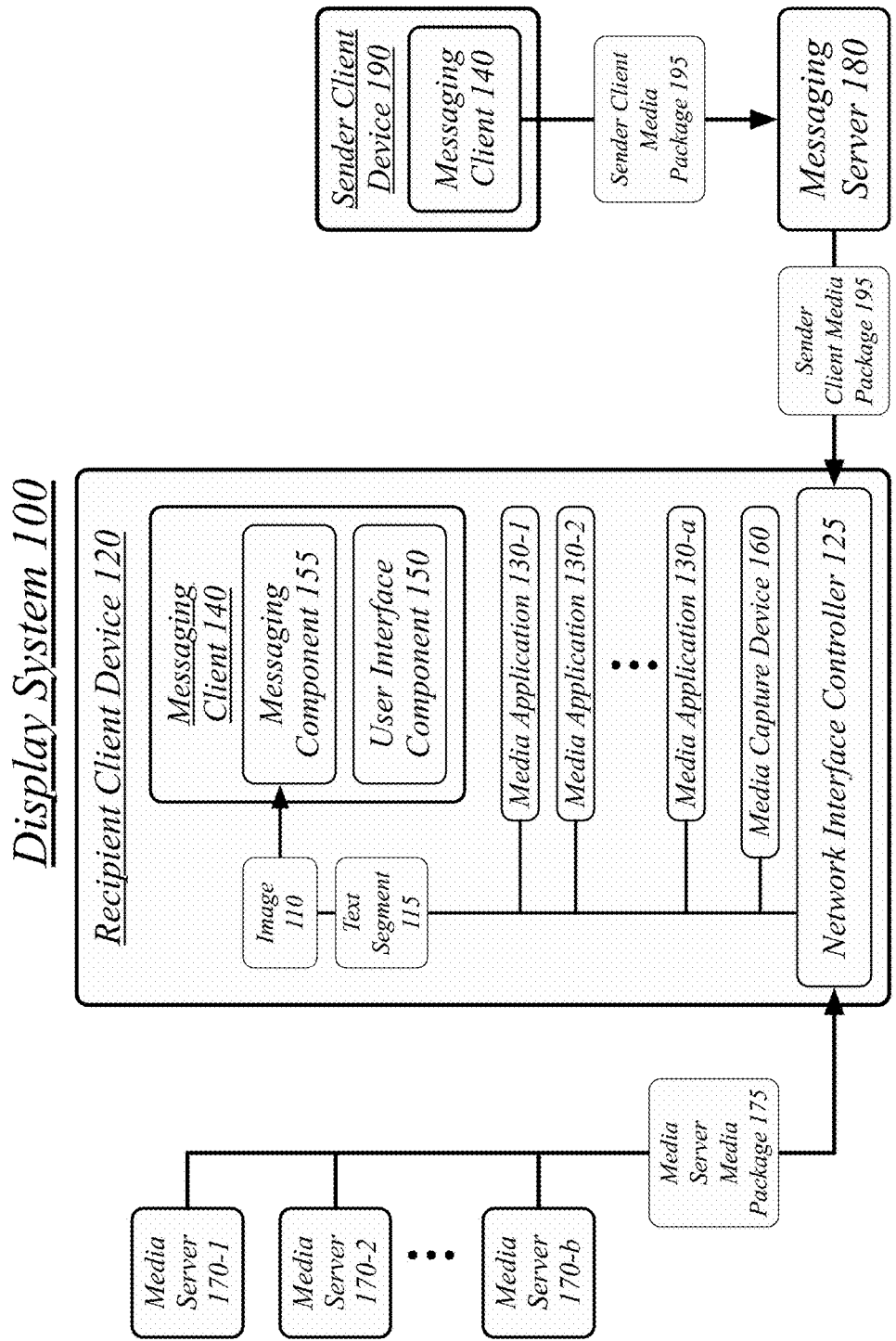
FIG. 1 illustrates an embodiment of a display system.

Images may be displayed in association with text on a device. This associated display may consist of an overlay of the text on top of the image. In order to provide for the perceptibility and general legibility of the text, a background for the text may also be overlaid over top of the image. The composition of this background may be selected to balance between the goals of preserving the visibility of the image and providing for the legibility of the text.

In one scheme, a background contrast color may be overlaid on the image to provide contrast for the display of the text, with the contrast color behind and possibly around a text display area. For instance, a dark background may be applied to provide contrast for white or otherwise-light text. To blend the background with the image, some or all of the background contrast color overlay may be applied with a partial opacity (equivalently, a partial transparency) as to provide for increased contrast for the text while allowing partial visibility of the portion of the image behind the overlay. This partial opacity may be applied in a gradient in some or all of the overlay, so as to transition from a higher degree of opacity to a lower degree of opacity with distance from the text display area.

However, text color may be limited to a single or a few predefined configurations, such as black or white (or near-black or near-white), for aesthetic reasons. As such, the background contrast color may be limited to a few predefined configuration, such as white contrasting black text or black contrasting white text, for the same aesthetic reasons. The transition from the text display area to the unencumbered view of the image may be aided by simultaneously transitioning the overlay to reduced opacity while transitioning the overlay from the background contrast color to a background blend color selected based on the color properties of the image.

The legibility of text on an image may be impeded by multiple phenomenon. One issue may be sufficient contrast between the text color and the image color, which may be remedied by the use of an overlay of strongly contrasting color (e.g., black against white or white against black). Another issue may be the difficulty in finding the edges of the text caused by variation in the color of the image along the edges of the text. An overlay of any color, not just a high-contrast color, may reduce this issue and thereby aid legibility. As such, a background contrast color may be of primary value in the immediate vicinity of the text, while a background blend color selected to less interfere with the appearance of the image may be sufficient away from the immediate vicinity of the text while still aiding in legibility. As such, the simultaneous application of reduced opacity and transition from a contrast color to a blend color may better achieve the goal of providing legible text without interfering with appreciation of an image on which the text is overlaid.

As a result, the embodiments can improve the communication of text and image data and the configuration of a display device for the display of the text and image data in combination. In particular, the embodiments can improve the communication of text and image data on computer devices with limited screen real estate, such as mobile devices, that may particularly benefit from using combined text-and-image layouts that provide for larger image views by not reserving the text display area for the exclusive use of text.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a display system 100. In one embodiment, the display system 100 may comprise a computer-implemented system having software applications comprising one or more components. Although the display system 100 shown in FIG. 1 has a limited number of elements in a certain topology, it may be appreciated that the display system 100 may include more or less elements in alternate topologies as desired for a given implementation.

Images for display on a device, such as a recipient client device 120, may be received in association with a messaging system. For instance, a sender client media package 195 may be received via a messaging server 180 from a sender client device 190. An image 110 may comprise a photo sent by a contact on the messaging system to the user of the device, with a text segment 115 corresponding to a description, caption, sender, subject(s), name, file name, file size, capture location, capture time, capture date, time of receipt, or any other related information. A text segment 115 may include text associated with controls, such as may empower manipulation, saving, forwarding, replying to, or other operations related to images. An image 110 may be a profile photo for a user with a messaging system or social-networking system, the text segment 115 corresponding to profile information for the user, such as their name. An image 110 may be an photo, picture, video frame, frame of an animated image (e.g., an animated Graphics Interchange Format (GIF) image), or any other image file. It will be appreciated that the embodiments described herein may be applied to any image display, whether in association with a messaging system, social-networking system, or not.

A user's access to a display system 100 may be a messaging client 140 installed as a user application on a client device, such as sender client device 190 or recipient client device 120, and executing locally on the client device. In some cases, the messaging client 140 may include other functionality. For example, the messaging client 140 may be a front-end to a social-networking service, providing messaging services in association with the social-networking service. In many cases, a client device may be a smartphone, cell phone, or other mobile device using a mix of Wi-Fi and cellular data networks to access the Internet and networked resources, though it will be appreciated that any form of network access may be used. For example, one device may tether to another, such as a smart watch tethering to a Internet-capable device (e.g., mobile phone, personal computer) or a mobile phone tethering to a personal computer. A client device may execute a plurality of applications, including the messaging client 140, one or more media applications 130, and other user applications. In other embodiments, however, the client device may comprise a personal computer device, a portable digital assistant, a tablet device, or any other form of computing device. Similarly, in some situations and embodiments, a user may access the display system 100 via a web portal, with the messaging client 140 executing as a web-based application.

A client device may communicate with other devices using wireless transmissions to exchange network traffic. Exchanging network traffic, such as may be included in the exchange of messaging transactions, may comprise transmitting and receiving network traffic via a network interface controller 125 (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller 125 may be used for the network activities of the embodiments described herein, including the interoperation of the media applications 130, media servers 170, messaging client 140, and messaging server 180 through network communication. For example, the messaging client 140 receiving an image 110 via a network may be interpreted as using the network interface controller 125 for network access to a communications network for the transmission or reception of information.

The media applications 130 may comprise applications for one or more of searching media content, discovering media content, sharing media content, storing media content, accessing media content, modifying media content, and combining media content. Each of the media applications may be associated one or more media services, either a dedicated media application for a particular media service or a media application interoperating with a plurality of media services. Each of the media services may provide one or more media servers 170 for storing, retrieving, and generally exchanging media content. In some embodiments, one or more of the media servers 170 may be internal to a messaging system, with the messaging system providing media content that may be intermingled with media content from third-party media services providing other media content. The media servers 170 may distribute media packages to the local media applications 130, where a media server media package 175 comprises one or more media items and associated information, such as an image 110 and text segment 115 for display in association.

The client device 120 may include a media capture device 160. The media capture device 160 may comprise a camera operative to capture one or both of still images and moving images (i.e., video) and/or a microphone operative to capture audio either or both of in isolation or in synchronization with the capture of moving images (i.e., film with sound). The media capture device 160 may provide media capture data to the messaging client 140, the media capture data comprising one or more of image content, video content, audio content (e.g., for video), media capture context information, and any other media-capture related data. The messaging client 140 may be empowered by a client device, such as by an operating system of the client device, to access the media capture device 160—as may be mediated by operating system application programming interfaces (APIs)—and capture media content. Media capture data may include the image 110, with at least some portion of the text segment 115 comprising media-capture related data.

The messaging client 140 may comprise a user interface component 150. The user interface component 150 may be generally arranged to provide interfaces to the functionality of the messaging client 140. For instance, the user interface component 150 may provide interfaces to media capture, media retrieval, and other media functions. The user interface component 150 may provide interfaces to message viewing, message composition, message sending, and other messaging functions. In general, the user interface component 150 may provide interfaces for any functionality of the messaging client 140.

Determining the selection of a control, area, or other element of a user interface may comprise receiving an interrupt, API call, signal, or other indication from an interface library and/or operating system of a client device. The user interface component 150 may be operative to receive user interface interactions from the operating system and to translate these user interface interactions into the activation of various user interface elements. In some embodiments, various user interface elements may be registered with an interface library and/or operating system, with the interface library and/or operating system providing user interface interactions in reference to particular user interface elements.

The messaging client 140 may comprise a messaging component 155. The messaging component 155 may be generally arranged to provide messaging services to a user of the client device. Messaging services may comprise the reception of messages, the sending of messages, the maintenance of a history of messages exchanged, and other messaging-related activities. User of the messaging client 140 may be empowered to engage in messaging conversations with a plurality of other users in both private user-to-user conversations, in private group conversations between three or more users, and in public conversations generally open to the messaging community. The messaging component 155 may expose this functionality to the user using the user interface component 150.

The display system 100 may interact with messaging servers from among a plurality of messaging servers, such as messaging server 180. A messaging server 180 may operate as an intermediary between the messaging endpoints of users of the display system 100. Messaging servers may track the current network address of a user's active messaging endpoint or endpoints, such as they change network (e.g., a mobile client device moving between Wi-Fi networks, between cellular data networks, and between Wi-Fi and cellular data networks). Messaging servers may queue messages for messaging endpoints when they are offline or otherwise not accepting new messages. Messaging servers may provide an ordering on messages for a particular user so as to provide consistency in the flow of communication between the potentially multiple messaging endpoints that a user might use. Messaging servers may store a messaging history for each user so as to provide access to previously-sent or received messages for a user. The messaging history may include media exchanged between users using the display system 100. This media may include the image 110 for display by the messaging client 140.

The display system 100 may use knowledge generated from interactions in between users. The display system 100 may comprise a component of a social-networking service and may use knowledge generated from the broader interactions of the social-networking service. As such, to protect the privacy of the users of the display system 100 and the larger social-networking service, display system 100 may include an authorization server (or other suitable component(s)) that allows users to opt in to or opt out of having their actions logged by the display system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the display system 100 and other elements of a social-networking service through blocking, data hashing, anonymization, or other suitable techniques as appropriate.

Figure 2:
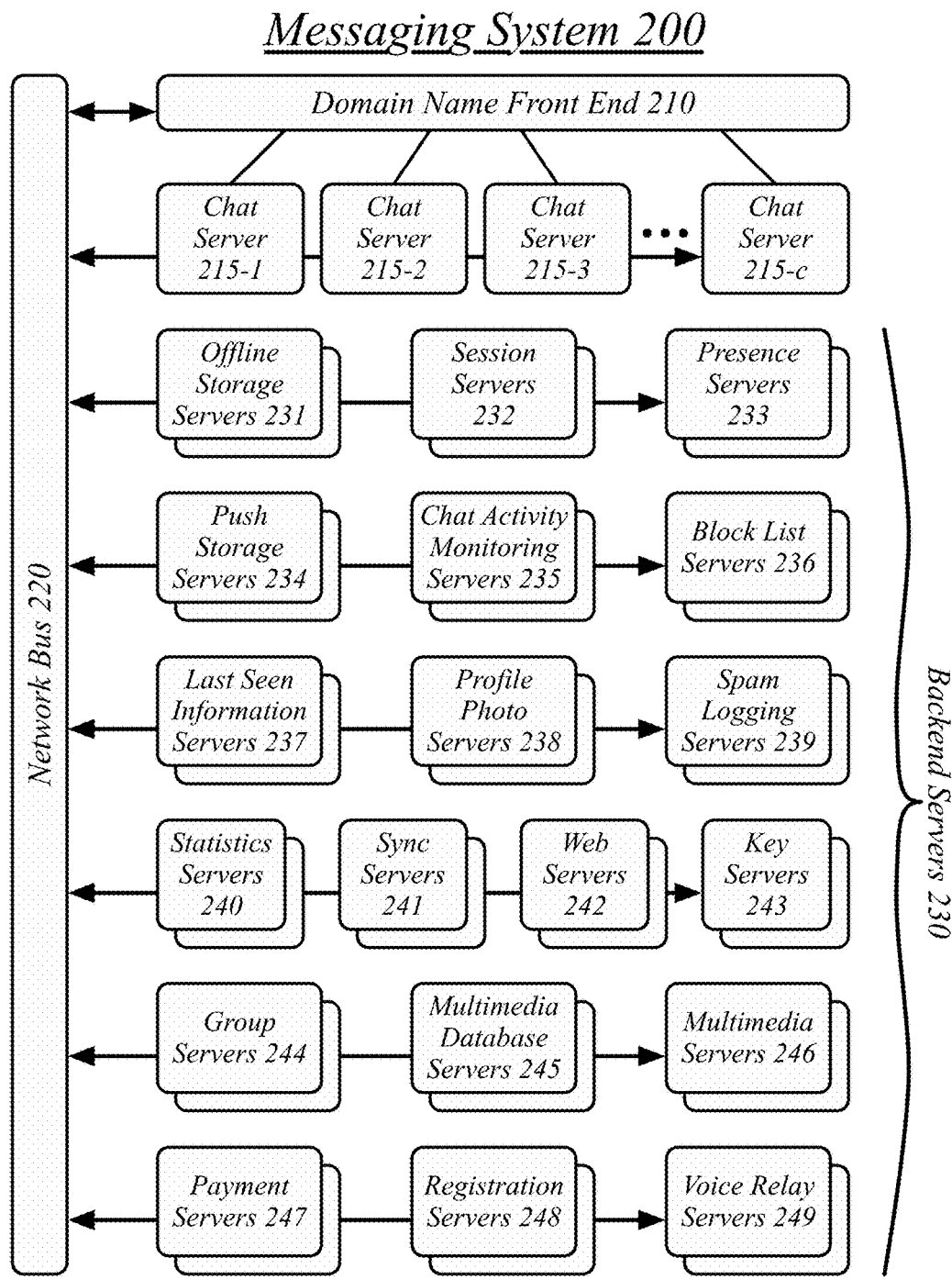
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the display system 100 with the operations of the display system 100 comprising a portion of the overall operations of the messaging system 200. The illustrated embodiment of the messaging system 200 may particularly correspond to a portion of the messaging system described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the messaging web access system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
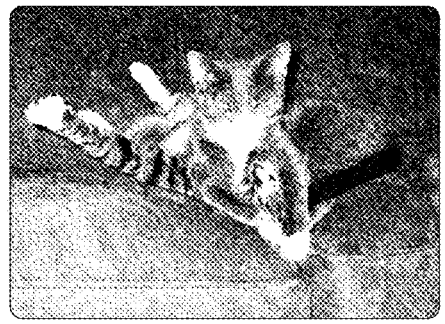
FIG. 3 illustrates an embodiment of a text and gradient overlay.
Figure 3:
Figure 3:
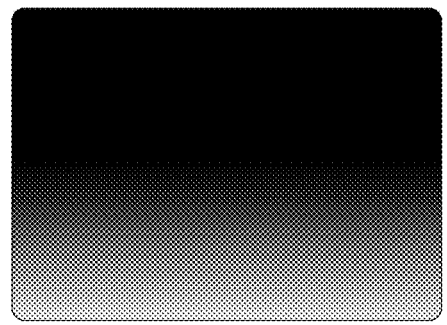
Figure 3:

FIG. 3 illustrates an embodiment of a text and gradient overlay.

The illustrated original image 310 may correspond to an image 110 for display by an application such as a messaging client 140. This original image 310 may be for display in combination with a text segment, such as the segment "Alex and Joey hanging out on the couch" in description of the photo comprising the original image 310.

The text segment for display may be arranged against a mixed color gradient 320 overlaid on top of the original image 310. The mixed color gradient 320 may comprise a transition from a background contrast color to a background blend color. The background contrast color may be primarily used in a text segment display area with which the text will be contrasted. The background blend color may be primarily used in a portion of the overlay away from the text segment display area in which the overlay blends into the original image 310. The background blend color may be selected based on the color composition of the original image 310 so as to blend with the original image 310. The transition between the background contrast color and the background blend color may be a gradient between the intensity of the two colors.

The mixed color gradient overlay may be blended with the original image 310 by having a higher opacity in the text segment display area and a lower opacity away from the text segment display area. This transition in opacity may be defined by a blending gradient 330. A blending gradient 330 may define an opacity of the overlay at each position of the original image 310, with the blending gradient 330 defining an iterative reduction in opacity—an iterative increase in transparency—away from the text segment display area. In some embodiments, the text segment may be applied with the same opacity as the opacity of the overlay against which it is contrasted. In other embodiments, the text segment may be applied with complete (i.e., one-hundred percent) opacity whatever the opacity of the overlay against which it is contrasted. In alternative embodiments, the text segment may be applied with a predefined opacity other than one-hundred percent, the predefined opacity defined distinctly from the blending gradient 330.

The mixed color gradient may therefore be overlaid above original image 310 with an opacity defined according to a blending gradient 330, and the text placed in the text segment display area of highest opacity, to produce a mixing gradient combined image 340. The mixing gradient combined image 340 may comprise a display of the original image 310 with the text displayed against a mixed color gradient 320 overlaid with an opacity according to a blending gradient 330. The mixing gradient combined image 340 may be displayed in this combination by the user interface component 150 of a messaging client 140.

Figure 4A:
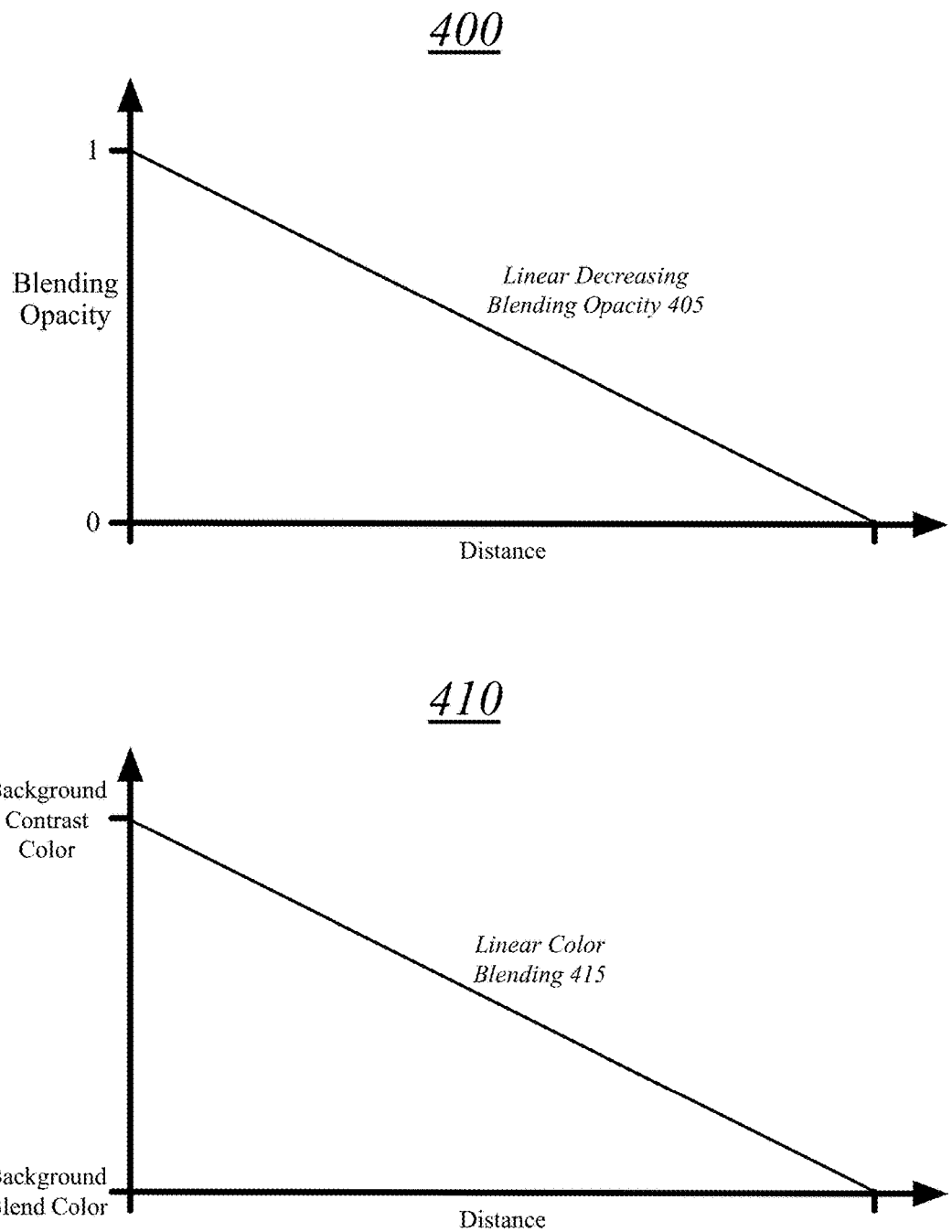
FIG. 4A illustrates an embodiment of linear blending.

FIG. 4A illustrates an embodiment of linear blending in a first graph 400 and second graph 410.

In some embodiments, a blending gradient 330 may have a linear decreasing blending opacity 405, wherein the decrease in opacity is linear with respect to distance. In some embodiments, this linear decreasing blending opacity 405 may be applied starting at the border of the text segment display area—the area immediately behind the displayed text—or may be applied starting at the center of it, or with any other arrangement. Where the linear decreasing blending opacity 405 is applied starting at the border of the text segment display area, the area of the text segment display area may have a uniform, such as a maximal, opacity.

In some embodiments, the mixed color gradient 320 may be generated according to a linear color blending 415, wherein the transition from the background contrast color to the background blend color is linear with respect to distance. In some embodiments, this linear color blending 415 may be applied starting at the border of the text segment display area—the area immediately behind the displayed text—or may be applied starting at the center of it, or with any other arrangement. Where the linear color blending 415 is applied starting at the border of the text segment display area, the area of the text segment display area may have a uniform color, such as the background contrast color.

While the illustrated embodiment of FIG. 4A indicates that the maximal opacity may be complete, or one-hundred percent, opacity, in some embodiments the maximum opacity may be a partial opacity. A predefined maximum opacity may be used, with the reduction in opacity with distance decreasing from this predefined maximum.

Figure 4B:
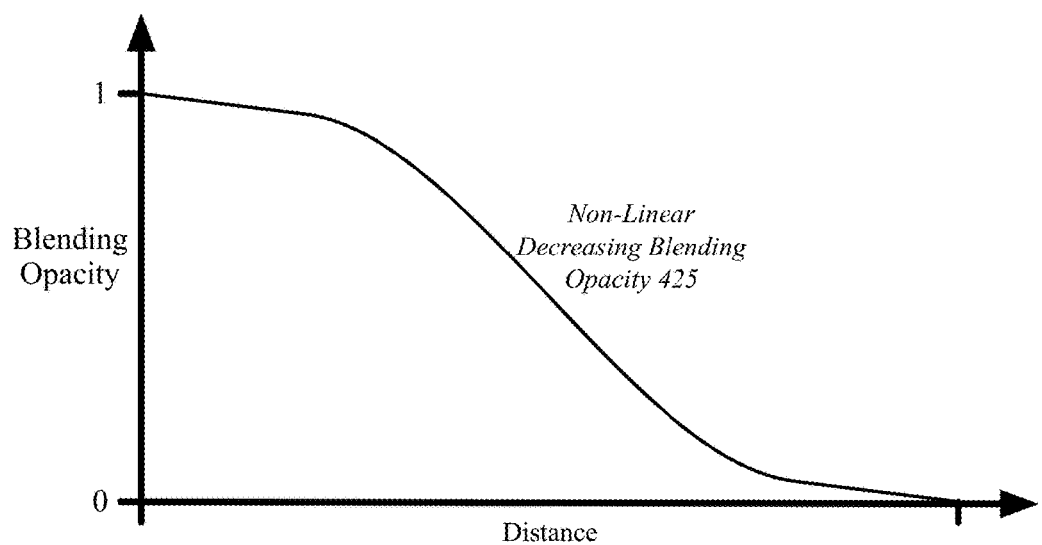
FIG. 4B illustrates an embodiment of non-linear blending.
Figure 4B:
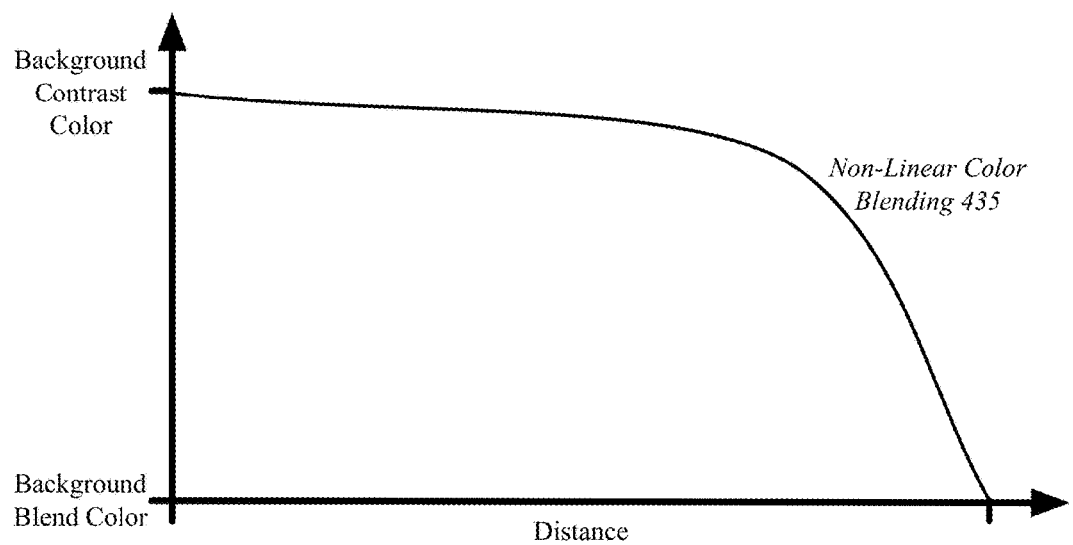

FIG. 4B illustrates an embodiment of non-linear blending in a first graph 420 and second graph 430.

In some embodiments, a blending gradient 330 may have a non-linear decreasing blending opacity 425, wherein the decrease in opacity is not linear with respect to distance. In some embodiments, this non-linear decreasing blending opacity 425 may be applied starting at the border of the text segment display area—the area immediately behind the displayed text—or may be applied starting at the center of it, or with any other arrangement. Where the non-linear decreasing blending opacity 425 is applied starting at the border of the text segment display area, the area of the text segment display area may have a uniform, such as a maximal, opacity.

A non-linear decreasing blending opacity 425 may be defined to increase the rate of change in opacity with respect to distance of in one or more portions of an overlay while decreasing the rate of change in opacity with respect to distance in one or more other portions. For instance, the rate of change in opacity with respect to distance in a first portion in proximity to the text segment display area of the overlay and the rate of change in opacity with respect to distance in a second portion in proximity to the exterior of the overlay may both be lower than the rate of change with respect to distance in a third portion between the first portion and the second portion. This may serve to increase the contrast of the text segment 115 against the overlay by using a higher opacity in proximity to the text segment 115 while increasing the rate of decrease in the proximity when less proximate to the text segment 115.

In some embodiments, the mixed color gradient 320 may be generated according to a non-linear color blending 435, wherein the transition from the background contrast color to the background blend color is not linear with respect to distance. In some embodiments, this non-linear color blending 435 may be applied starting at the border of the text segment display area—the area immediately behind the displayed text—or may be applied starting at the center of it, or with any other arrangement. Where the non-linear color blending 435 is applied starting at the border of the text segment display area, the area of the text segment display area may have a uniform color, such as the background contrast color.

A non-linear color blending 435 may be defined to increase the rate of change in color composition with respect to distance of in one or more portions of an overlay while decreasing the rate of change in opacity with respect to distance in one or more other portions. For instance, the rate of change in opacity with respect to distance in a first portion in physical proximity to the text segment display area of the overlay may be lower than the rate of change with respect to distance in a second portion in proximity to the exterior of the overlay. This may serve to increase the visibility of the text segment 115 by primarily using the background contrast color in proximity to the text segment 115 while increasing the color blending with the image 110 when less proximate to the text segment 115.

Figure 5:
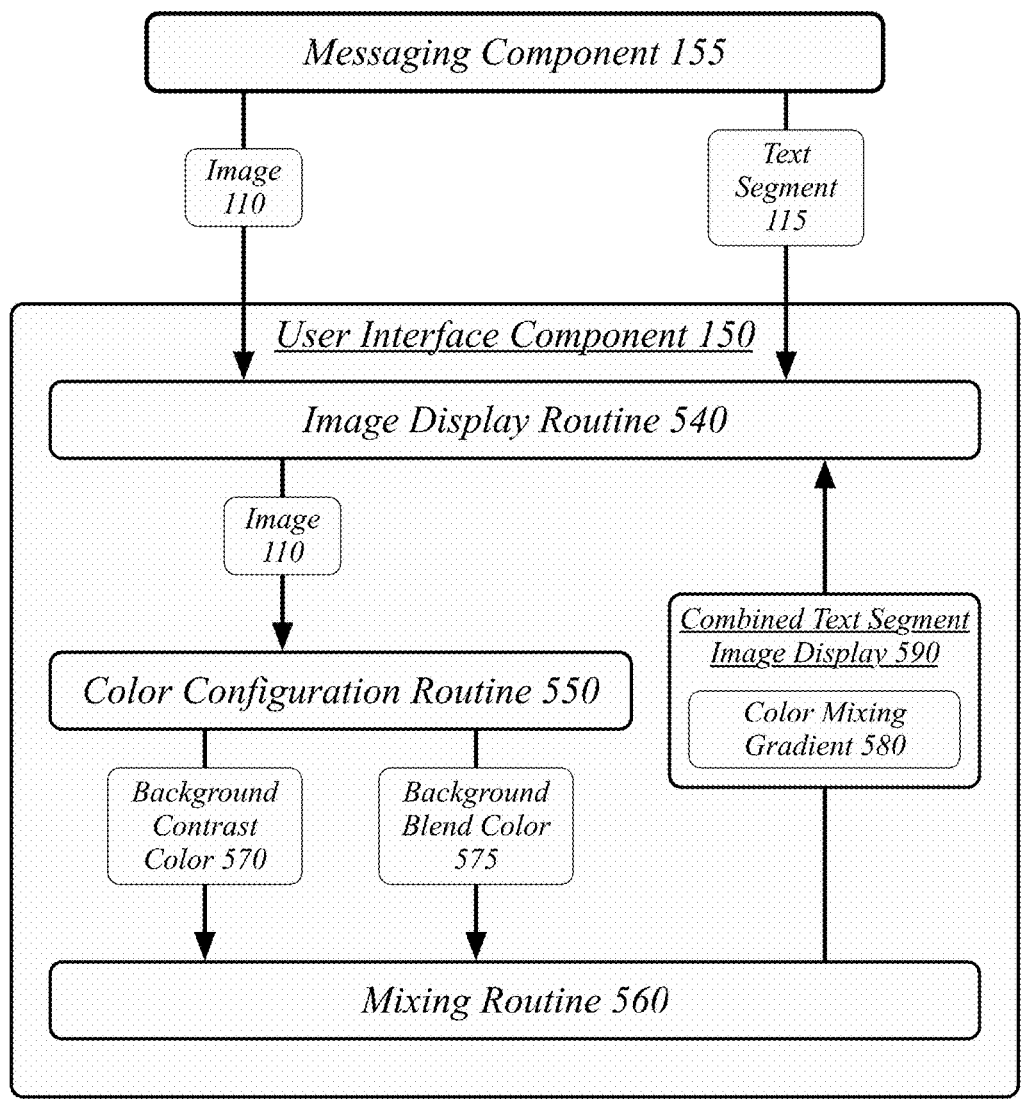
FIG. 5 illustrates the generation of a combined text segment image display.

FIG. 5 illustrates the generation of a combined text segment image display 590.

The user interface component 150 may comprise one or more routines, the one or more routines comprising a sequence of instructions operative on a processor circuit to perform one or more tasks in the performance of the operations of the user interface component 150. The user interface component 150 may comprise an image display routine 540, a color configuration routine 550, and a mixing routine 560.

The user interface routine 540 may be operative to receive an image 110 on a device, such as the recipient client device 190, the device comprising a display device. The user interface routine 540 may be operative to receive a text segment 115 on the device. Receiving the image 110 may comprise receiving an image from a messaging server 180, media application, or media server. Receiving the image 110 may comprise having the image requested by a user for display. Receiving the image 110 may comprise the image 110 forming at least a portion of a user interface display, such as a profile photo for a user profile. Receiving the text segment 115 may comprise receiving the text segment 115 in association with the image 110, such as the text segment 115 comprising information related to the image 110.

The color configuration routine 550 may be operative to determine a background contrast color 570. The background contrast color may be predefined, such as predefined as the color black. Alternatively, the background contrast color 570 may be determined based on a color value of the text segment display area for the image 110. The color configuration routine 550 may determine whether the portion of the image 110 within the text segment display area is predominantly lightly-colored or darkly-colored. The color configuration routine 550 may determine the average, typical, or other measure of the intensity of the pixels of the image 110 and compare the measure to a predefined threshold for determining the background contrast color 570. In some embodiments, the background contrast color 570 may be assigned as one of black or white. In some embodiments, the text segment 115 is assigned a contrasting color to the background contrast color 570. For instance, if the background contrast color 570 is black, the text segment 115 may be assigned a contrasting color of white. If the background contrast color 570 is white, the text segment 115 may be assigned a contrasting color of black.

The color configuration routine 550 may be operative to determine a background blend color 575 based on the image 110. The background blend color 575 may be determined based on a dominant color of the image 110. The background blend color 575 may be determined based on a dominant color of the text segment display area for the image. Known techniques for determining the dominant color of an image 110 or an area of an image 110 may be used.

The mixing routine 560 may be operative to generate a color mixing gradient 580 based on the background contrast color 570 and the background blend color 575. The mixing routine 560 may be operative to generate a combined text segment image display 590 by positioning the text segment 115 in a text segment display area of a mixed gradient overlay of the color mixing gradient on the image 110. The user interface routine 540 may be operative to display the combined text segment image display 590 on a display device of the device.

The text segment display area may be a predefined area of a layout for the image 110. The text segment display area may be defined based on a predefined layout for an image 110 being used in a particular type of user interface display. For instance, a display for an image received from another user of a messaging system, for an image displayed as a profile picture, and other image-display instances may each be associated with an image-display layout, the image-display layout comprising a predefined area for text segment display.

The background blend color 575 may increase in mixing proportion with the background contrast color 570 in the color mixing gradient with distance from the text segment display area. The mixed gradient overlay may decrease in opacity with distance from the text segment display area. As such, the background blend color 575 may increase in mixing proportion in the color mixing gradient 580 in conjunction with the color mixing gradient 580 decreasing in opacity.

In some cases, the image 110 may comprise a frame of a plurality of frames, such as for a video or animated image (e.g., an animated GIF). The color configuration routine 550 may generate a plurality of background blend colors based on each of the plurality of frames and the image display routine 540 may display the text segment 115 against the plurality of frames based on the generated plurality of background blend colors. The mixing routine 560 may iteratively generate a plurality of color mixing gradients based on the plurality of frames, generate a plurality of combined text segment image displays based on the plurality or frames and the plurality of color mixing gradients, and display the plurality of combined text segment image displays in sequence as a playback of the plurality of frames. In some cases, only a portion of the plurality of frames may be displayed with the text segment, such as only an initial period of a video.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
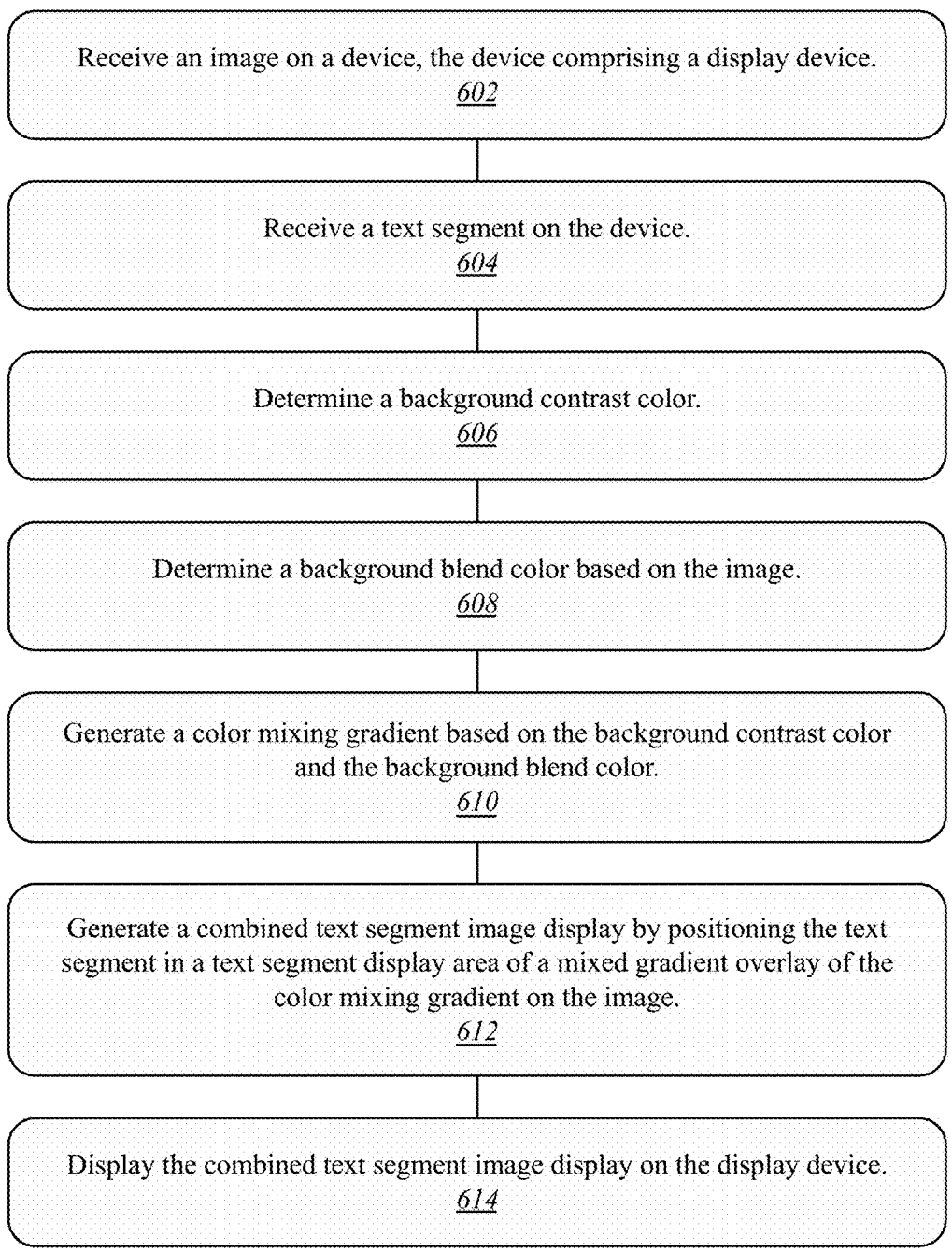
FIG. 6 illustrates an embodiment of a logic flow for the system of FIG. 1.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive an image on a device, the device comprising a display device at block 602.

The logic flow 600 may receive a text segment on the device at block 604.

The logic flow 600 may determine a background contrast color at block 606.

The logic flow 600 may determine a background blend color based on the image at block 608.

The logic flow 600 may generate a color mixing gradient based on the background contrast color and the background blend color at block 610.

The logic flow 600 may generate a combined text segment image display by positioning the text segment in a text segment display area of a mixed gradient overlay of the color mixing gradient on the image at block 612.

The logic flow 600 may display the combined text segment image display on the display device at block 614.

The embodiments are not limited to this example.

Figure 7:
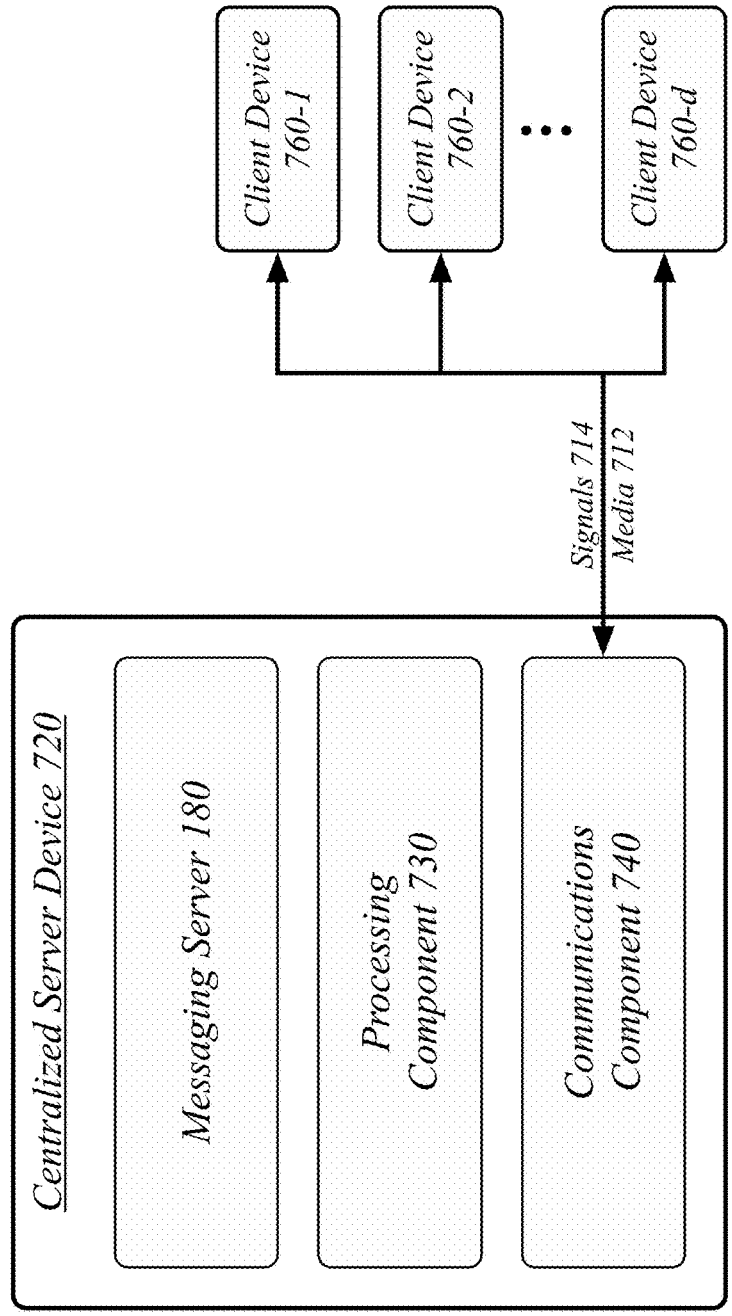
FIG. 7 illustrates an embodiment of a centralized system for the system of FIG. 1.

FIG. 7 illustrates a block diagram of a centralized system 700. The centralized system 700 may implement some or all of the structure and/or operations for the display system 100 in a single computing entity, such as entirely within a single centralized server device 720.

The centralized server device 720 may comprise any electronic device capable of receiving, processing, and sending information for the display system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the display system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the display system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with client devices 760 over a communications media 712 using communications signals 714 via the communications component 740. The client devices 760 may correspond to the client devices 120, 190 described with reference to FIG. 1, as well as other client devices that may be supported by the display system 100 and/or a messaging system 200. The centralized server device 720 may implement the messaging server 180.

Figure 8:
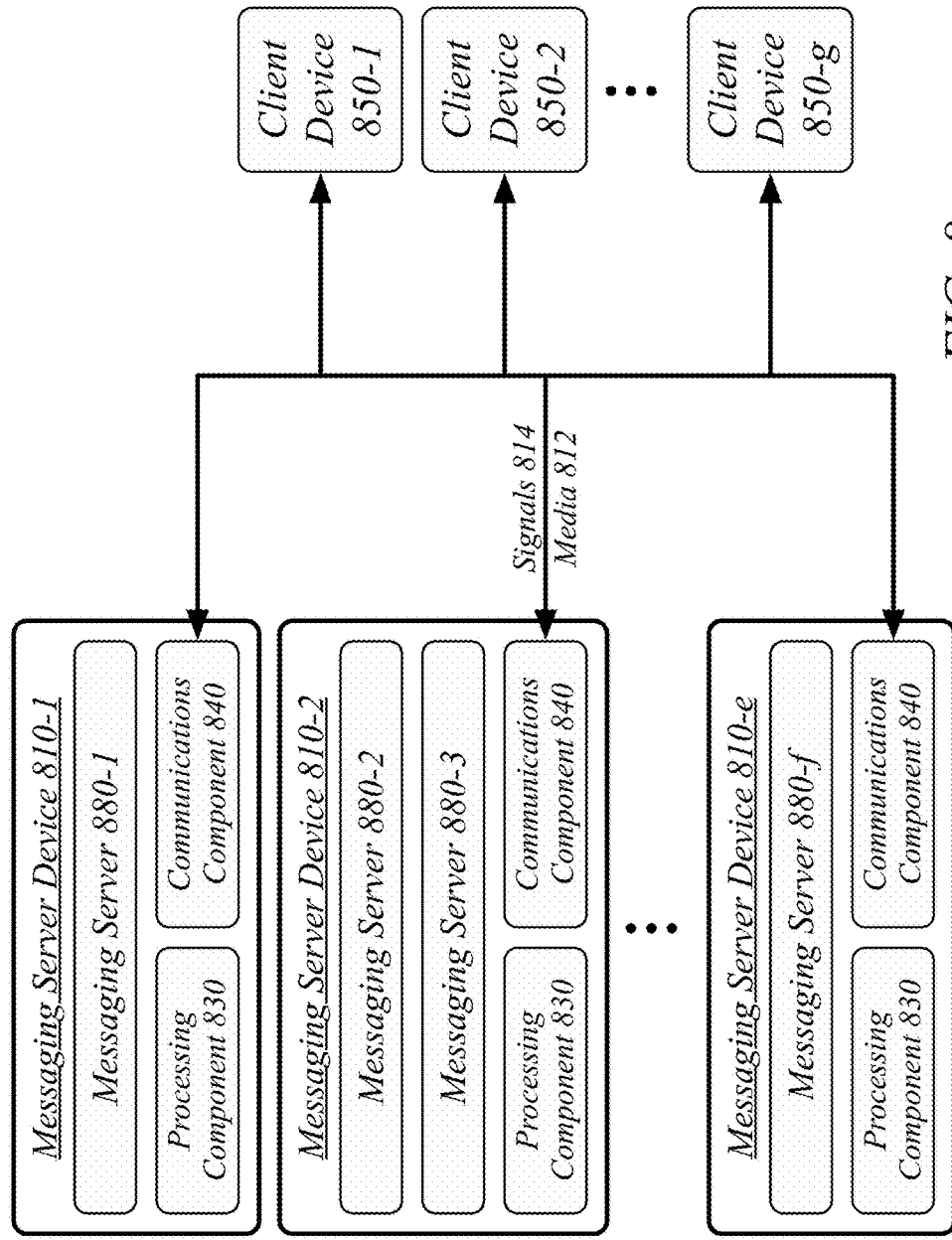
FIG. 8 illustrates an embodiment of a distributed system for the system of FIG. 1.

FIG. 8 illustrates a block diagram of a distributed system 800. The distributed system 800 may distribute portions of the structure and/or operations for the display system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of messaging server devices 810. In general, the server devices 810 may be the same or similar to the centralized server device 720 as described with reference to FIG. 7. For instance, the server devices 810 may each comprise a processing component 830 and a communications component 840 which are the same or similar to the processing component 730 and the communications component 740, respectively, as described with reference to FIG. 7. In another example, the server devices 810 may communicate over a communications media 812 using communications signals 814 via the communications components 840.

The messaging server devices 810 may comprise or employ one or more client programs that operate to perform various methodologies in accordance with the described embodiments. In one embodiment, for example, the first server device 810 may implement one or more messaging servers 880. Each of the messaging server devices 810 may execute one or more messaging servers 880. One of the messaging servers 880 may correspond to the messaging server 180 described with reference to FIG. 1. The messaging servers 880 may communicate with the client devices 850 using the signals 814 sent over media 812. The client devices 850 may generally correspond to the client devices 760, including client devices 120, 190.

Figure 9:
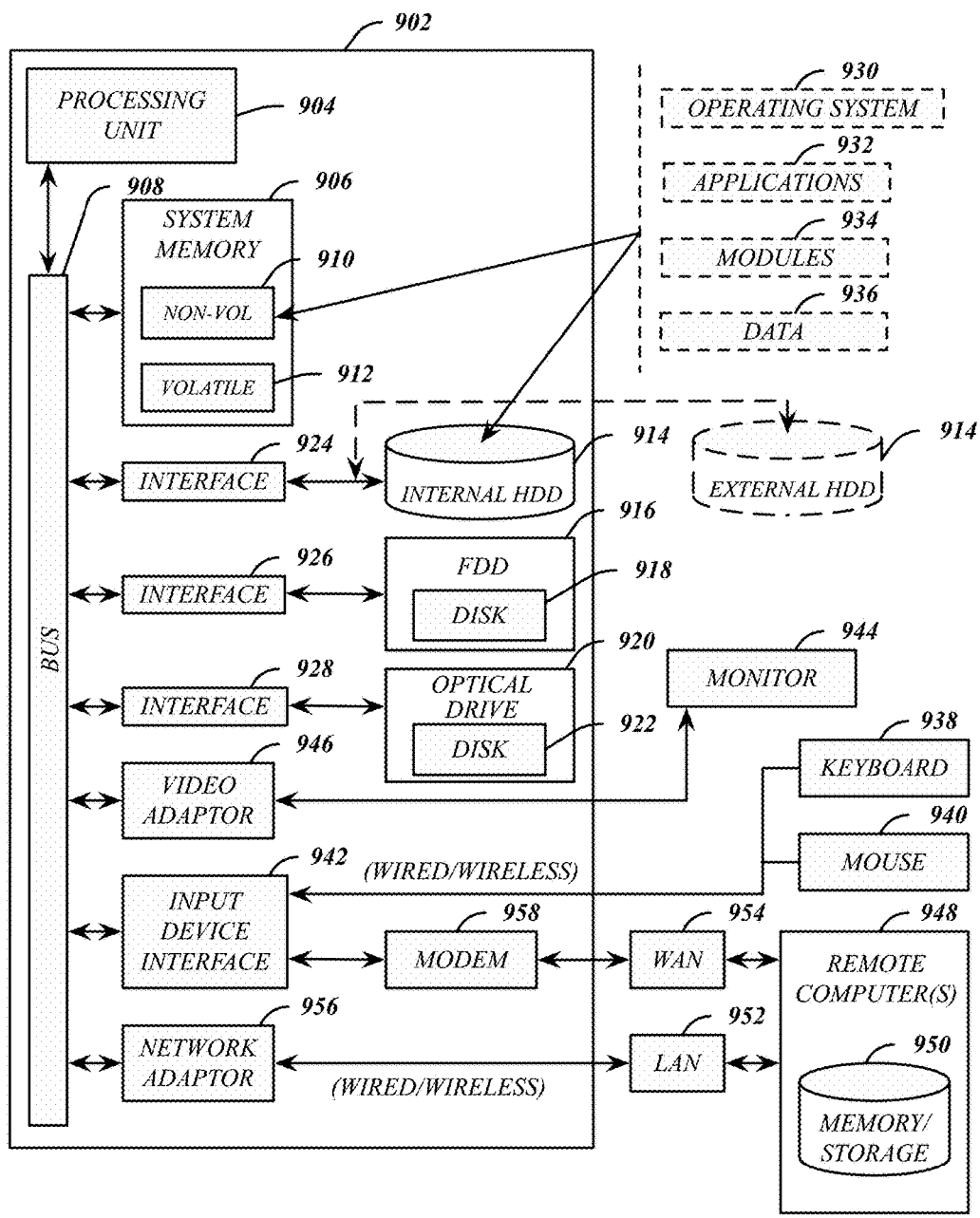
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 7, 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the display system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
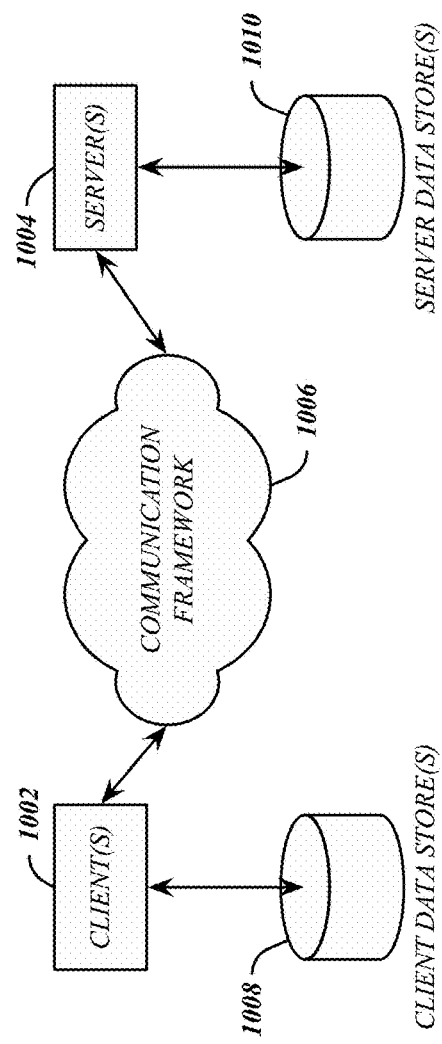
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client devices 120, 190, 760, 850. The servers 1004 may implement the server devices 720, 810. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
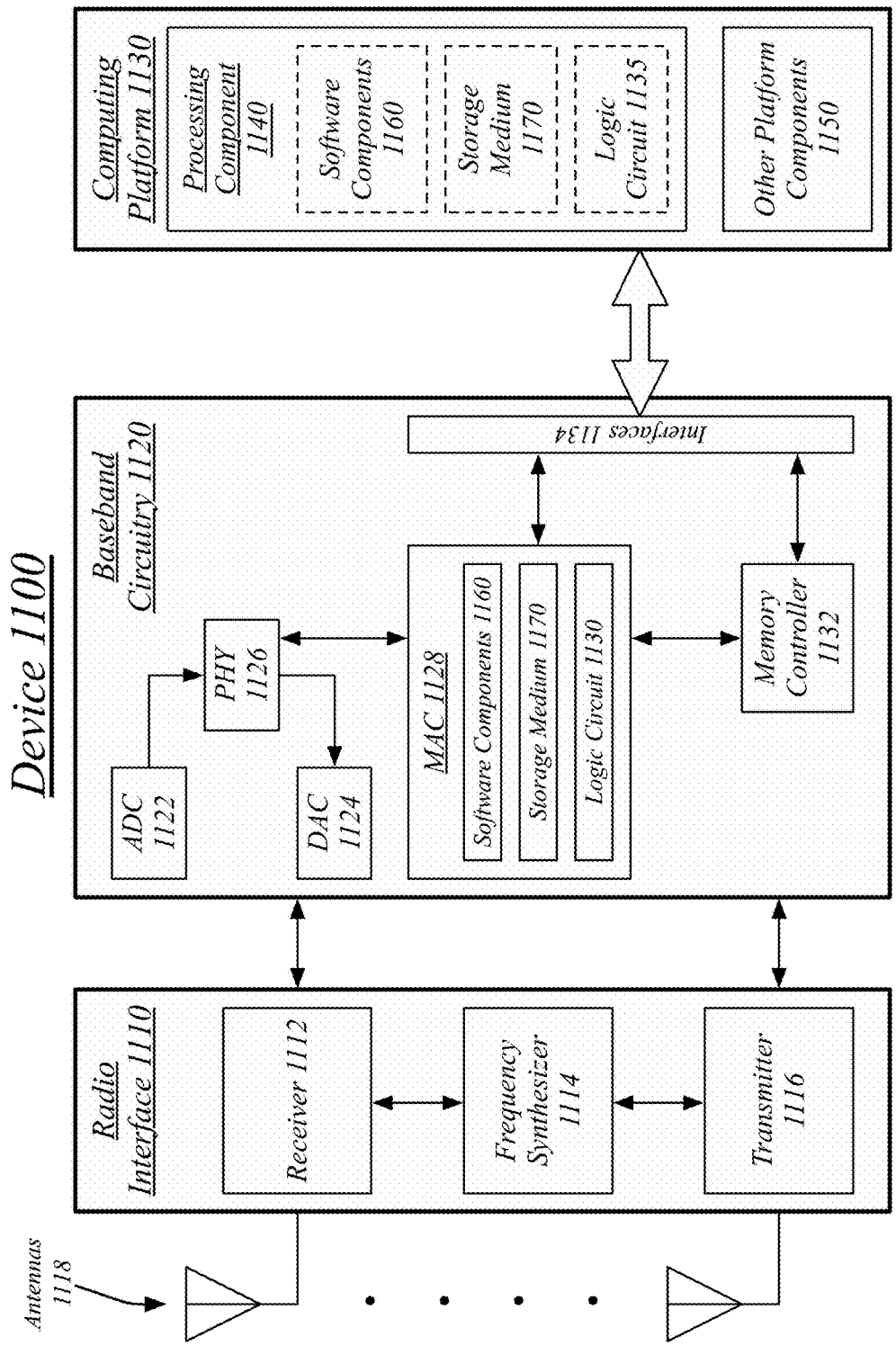
FIG. 11 illustrates an embodiment of a radio device architecture.

FIG. 11 illustrates an embodiment of a device 1100 for use in a multicarrier OFDM system, such as the display system 100. Device 1100 may implement, for example, software components 1160 as described with reference to display system 100 and/or a logic circuit 1135. The logic circuit 1135 may include physical circuits to perform operations described for the display system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the display system 100 and/or logic circuit 1135 in a single computing entity, such as entirely within a single device. Alternatively, the device 1100 may distribute portions of the structure and/or operations for the display system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the display system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving an image on a device, the device comprising a display device; receiving a text segment on the device; determining a background contrast color; determining a background blend color based on the image; generating a color mixing gradient based on the background contrast color and the background blend color; generating a combined text segment image display by positioning the text segment in a text segment display area of a mixed gradient overlay of the color mixing gradient on the image; and displaying the combined text segment image display on the display device.

A computer-implemented method may further comprise wherein the mixed gradient overlay decreases in opacity with distance from the text segment display area.

A computer-implemented method may further comprise wherein the background blend color increases in mixing proportion with the background contrast color in the color mixing gradient with distance from the text segment display area.

A computer-implemented method may further comprise wherein the background blend color increases in mixing proportion in the color mixing gradient in conjunction with the color mixing gradient decreasing in opacity.

A computer-implemented method may further comprise the background contrast color determined based on a color value of the text segment display area for the image, wherein the text segment is assigned a contrasting color to the background contrast color.

A computer-implemented method may further comprise the background blend color determined based on a dominant color of the image.

A computer-implemented method may further comprise the background blend color determined based on a dominant color of the text segment display area for the image.

A computer-implemented method may further comprise the image comprising a frame of a plurality of frames, further comprising: generating iteratively a plurality of color mixing gradients based on the plurality of frames; generating a plurality of combined text segment image displays based on the plurality or frames and the plurality of color mixing gradients; and displaying the plurality of combined text segment image displays in sequence.

An apparatus may comprise a processor circuit on a device; an image display routine operative on the processor circuit to receive an image on a device, the device comprising a display device; receive a text segment on the device; and display a combined text segment image display. a color configuration routine operative on the processor circuit to determine a background contrast color; and determine a background blend color based on the image; and a mixing routine operative on the processor circuit to generate a color mixing gradient based on the background contrast color and the background blend color; and generate the combined text segment image display by positioning the text segment in a text segment display area of a mixed gradient overlay of the color mixing gradient on the image. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving an image on a device, the device comprising a display device;
   receiving a text segment on the device;
   determining a background contrast color;
   determining a background blend color based on the image;
   generating a mixed color gradient based on the background contrast color and the background blend color, the mixed color gradient providing a transition from the background contrast color to the background blend color, the transition being a gradient between the background contrast color and the background blend color;
   positioning the text segment in a text segment display area of the mixed color gradient;
   generating a combined text segment image display by overlaying the mixed color gradient on the image; and
   displaying the combined text segment image display on the display device.

2. The method of claim 1, wherein the mixed color gradient decreases in opacity with distance from the text segment display area.

3. The method of claim 1, wherein the background blend color increases in mixing proportion with the background contrast color in the mixed color gradient with distance from the text segment display area.

4. The method of claim 1, wherein the background blend color increases in mixing proportion in the mixed color gradient in conjunction with the mixed color gradient decreasing in opacity.

5. The method of claim 1, the background blend color determined based on a dominant color of the image.

6. The method of claim 1, the background blend color determined based on a dominant color of the text segment display area for the image.

7. The method of claim 1, the image comprising a frame of a plurality of frames, further comprising:
   generating iteratively a plurality of mixed color gradients based on the plurality of frames;
   generating a plurality of combined text segment image displays based on the plurality or frames and the plurality of mixed color gradients; and
   displaying the plurality of combined text segment image displays in sequence.

8. An apparatus, comprising:
   a processor circuit on a device;
   an image display routine operative on the processor circuit to receive an image on a device, the device comprising a display device; receive a text segment on the device; and display a combined text segment image display;
   a color configuration routine operative on the processor circuit to determine a background contrast color; and determine a background blend color based on the image; and
   a mixing routine operative on the processor circuit to:
   generate a mixed color gradient based on the background contrast color and the background blend color, the mixed color gradient providing a transition from the background contrast color to the background blend color, the transition being a gradient between the background contrast color and background blend color;

position the text segment in a text segment display area of the mixed color gradient; and generate the combined text segment image display by overlaying the mixed color gradient on the image.

9. The apparatus of claim 8, wherein the mixed color gradient decreases in opacity with distance from the text segment display area.

10. The apparatus of claim 8, wherein the background blend color increases in mixing proportion with the background contrast color in the mixed color gradient with distance from the text segment display area.

11. The apparatus of claim 8, wherein the background blend color increases in mixing proportion in the mixed color gradient in conjunction with the mixed color gradient decreasing in opacity.

12. The apparatus of claim 8, the background blend color determined based on a dominant color of the image.

13. The apparatus of claim 8, the background blend color determined based on a dominant color of the text segment display area for the image.

14. The apparatus of claim 8, the image comprising a frame of a plurality of frames, further comprising:

the color configuration routine operative to generate iteratively a plurality of mixed color gradients based on the plurality of frames; and generate a plurality of combined text segment image displays based on the plurality or frames and the plurality of mixed color gradients; and the image display routine operative to display the plurality of combined text segment image displays in sequence.

15. At least one non-transitory computer-readable storage medium comprising instructions that, when executed, cause a system to:

receive an image on a device, the device comprising a display device;

receive a text segment on the device;

determine a background contrast color;

determine a background blend color based on the image;

generate a mixed color gradient based on the background contrast color and the background blend color, the mixed color gradient providing a transition from the background contrast color to the background blend color, the transition being a gradient between the background contrast color in the background blend color;

position the text segment in the text segment display area of the mixed color gradient;

generate a combined text segment image display by overlaying the mixed color gradient on the image; and display the combined text segment image display on the display device.

16. The non-transitory computer-readable storage medium of claim 15, wherein the mixed color gradient decreases in opacity with distance from the text segment display area.

17. The non-transitory computer-readable storage medium of claim 15, wherein the background blend color increases in mixing proportion with the background contrast color in the mixed color gradient with distance from the text segment display area.

18. The non-transitory computer-readable storage medium of claim 15, wherein the background blend color increases in mixing proportion in the mixed color gradient in conjunction with the mixed color gradient decreasing in opacity.

19. The non-transitory computer-readable storage medium of claim 15, the background blend color determined based on a dominant color of the image.

20. The non-transitory computer-readable storage medium of claim 15, the background blend color determined based on a dominant color of the text segment display area for the image.

* * * * *